United States Patent Office 2,762,759
Patented Sept. 11, 1956

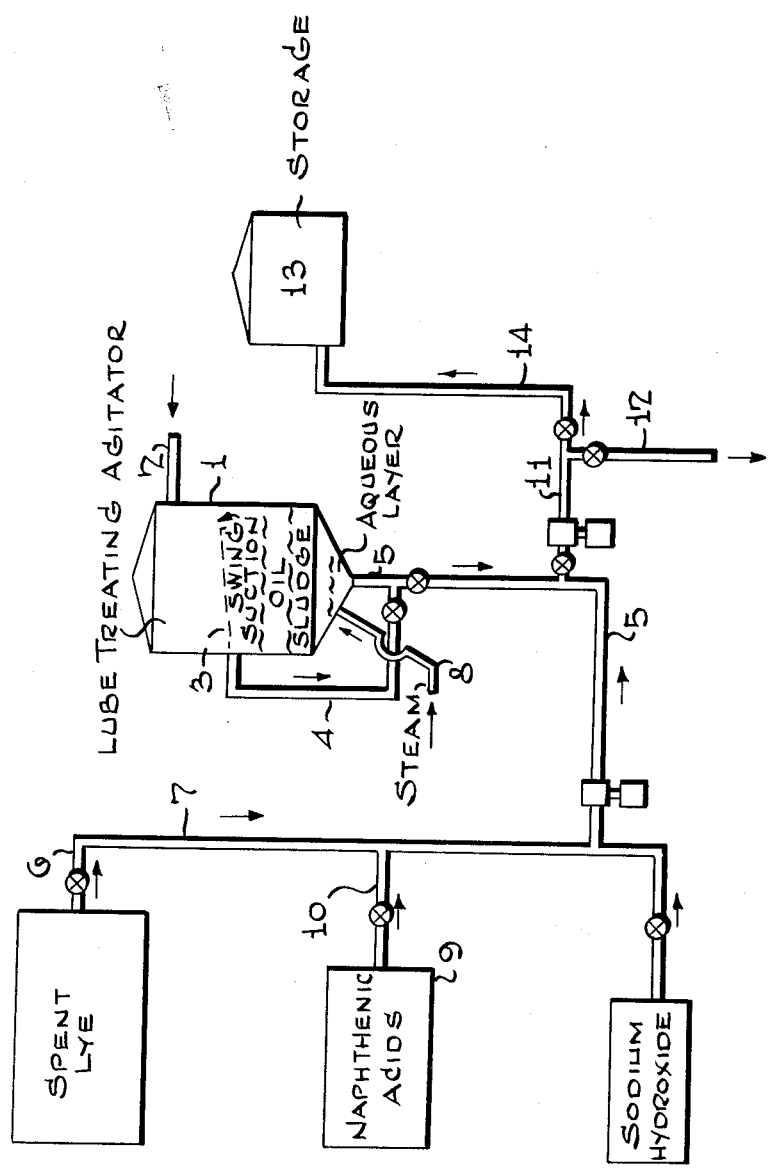

2,762,759

FLUIDIZING ACID SLUDGES BY ADDING NAPHTHENIC ACIDS AND SPENT CAUSTIC

Peter M. Mussallem, Ioco, British Columbia, Canada, assignor to Esso Research and Engineering Company, a corporation of Delaware Application April 25, 1952, Serial No. 284,218

4 Claims. (Cl. 196—148)

This invention relates to improvements in the processing of acid sludges and in particular to the improvement in the handling of heavy sulfuric acid sludges through a pumping system.

Heretofore various methods have been tried to convert acid sludges into more fluid materials which can be pumped. Included among such methods are fluxing the sludge with fuel oil, fluxing heavy lubricating oil acid sludges with lighter, more fluid naphtha sludges, treating the sludge with caustic soda and/or open steam, reaction of solidified sludge with lime, and addition of large amounts of sulfuric acid. Such methods have been only partially successful.

It is, therefore, the main object of this invention to provide an improved process for the treatment of acid sludges so that the same may be pumped long distances.

According to the present invention, acid sludge, after removal from the treated oil, is thoroughly mixed with spent lye obtained from the treatment of straight-run distillates, such as gasoline, lubricating oil or diesel oil and then mixed with naphthenic acids. Naphthenic acids may be used alone since they will easily dissolve the sludge at temperatures above 120° F. However, precipitation will occur at storage temperatures below 120° F.

A particularly effective method for carrying out the process of this invention is to first remove the oily layer remaining over the settled acid sludge. This may be accomplished by any convenient method, such as sweeping the oily layer by means of a water spray toward a suitably located pump intake. Any aqueous layer accumulating below the sludge is drawn off and a mixture of spent lye and naphthenic acid added while heating and agitating by means of an open steam spray. The final temperatures required and attained will vary with the nature of the sludge, although usual temperatures vary between 160° F. and 180° F. The mixture is allowed to stand and an upper homogeneous oil layer and a lower aqueous layer will separate out. The aqueous layer is discarded while the oil layer is removed and burned.

The amount of spent lye added to the sludge will vary depending upon the type of sludge, but, in general, a volume at least equal to one half that of the sludge will be necessary, but any amount from that equal to half of the sludge to six times that of the sludge can be used under certain circumstances.

The amount of naphthenic acids will likewise vary, but at least 0.25 volume of acid per volume of sludge should be used. Up to 5 volume of acid per volume of sludge can be used if desired.

For a further understanding of the invention, reference may be had to the accompanying drawing in which the single figure is an elevational view, generally diagrammatic, showing an apparatus embodying the improvements of the present invention.

Referring now to this drawing, an acid sludge obtained by treating a lubricating oil distillate is pumped into agitator 1 through line 2 and allowed to settle, whereby three layers are formed, an upper oil layer, a middle heavy sludge layer and a lower water layer. The oil is pumped off through swing section 3 and line 4 to sewer. The aqueous layer is drawn off from the bottom of agitator 1 through line 5. Spent lye from tank 6 is pumped into agitator 1 through lines 7 and 5. If desired, the lye from tank 6 may be heated prior to pumping into agitator 1. The contents of agitator 1 are then heated to 180° F. by the introduction of open steam by line 8. During this period of heating 0.25 barrel of naphthenic acids per parrel of acid sludge are pumped into agitator from tank 9 by lines 10, 7 and 5. The heating by open steam is continued for at least one-half hour and the contents then allowed to settle. Two layers form. The aqueous layer is drawn off to sewer through lines 5, 11 and 12. The oily layer is then pumped to storage 13 through lines 5, 11 and 14. Following evacuation of agitator 1, naphthenic acids are pumped from tank 9 through lines 10, 5, 11 and 14 to storage tank 13 to completely flush all sludge from the lines.

The advantages of the invention will be better understood from a consideration of the following experimental data which are given for the sake of illustration, but without intention of limiting the invention thereto.

An equal volume of spent lye obtained from the treatment of a lubricating oil base stock with sulfuric acid and a half volume (based on the sludge) of naphthenic acids were added to an acid sludge obtained by the treating of a lubricating oil distillate with sulfuric acid. The mixture was heated to 160° F., whereupon a fluid oily layer separated from a lower aqueous layer. On cooling, the viscosity of the oily layer increased, but no precipitation of solids occurred. On reheating, a homogeneous fluid with decreased viscosity was again obtained.

The nature of the present invention having been thus fully set forth and specific examples of the same given, what is claimed as new and useful and desired to be secured by Letters Patent is:

1. The method of decomposing acid sludges which comprises mixing one volume of an acid sludge, derived from the action of sulfuric acid on a viscous hydrocarbon oil with at least one half volume of spent caustic derived from the treatment of a straight-run petroleum distillate and at least one quarter volume of naphthenic acids, and separating the resulting aqueous layer from the resulting oil layer.

2. The method of conditioning heavy viscous substantially unpumpable sulfuric acid sludges to facilitate pumping thereof, which comprises mixing, at a temperature between about 160° and 180° F., an acid sludge derived from the action of sulfuric acid on a viscous hydrocarbon oil with one-half to six volumes spent alkali derived from the treatment of petroleum distillates and 0.25 to 5 volumes of naphthenic acid per volume of sludge and separating the resulting aqueous layer from the resulting oil layer.

3. In a process wherein an acid sludge derived from the action of sulfuric acid on a viscous hydrocarbon oil is separated into an oily portion and an aqueous portion, the step which comprises mixing with one volume of such an acid sludge, prior to such separation, at least 0.5 volume of aqueous spent alkali derived from the treatment of a straight-run petroleum distillate, which alkali has been fortified with naphthenic acids, the amount of naphthenic acids being at least 0.25 volume per volume of sludge whereby the separation is more readily effected.

4. In a process wherein a sulfuric acid-oil sludge of highly viscous nature is treated to render the same more amenable to pumping, the step which comprises mixing one volume of an acid sludge derived from the action of concentrated sulfuric acid on a petroleum lubricating oil stock with 0.5 to 6 volumes of spent alkali derived from the treatment of a straight-run petroleum distillate, which alkali has been fortified with naphthenic acids in an amount sufficient to provide 0.25 to 5 volumes of naphthenic acids per volume of sludge.

References Cited in the file of this patent

UNITED STATES PATENTS

| | | |
|---|---|---|
| 1,409,590 | Salathe | Mar. 14, 1922 |
| 1,686,491 | Hughes et al. | Oct. 2, 1928 |
| 1,853,465 | Shepard | Apr. 12, 1932 |
| 1,938,513 | Brunck et al. | Dec. 5, 1933 |
| 2,064,549 | Lauer et al. | Dec. 15, 1936 |
| 2,151,147 | Protrowski et al. | Mar. 29, 1939 |
| 2,286,344 | Chechot | June 16, 1942 |
| 2,293,253 | Galindo et al. | Aug. 18, 1942 |
| 2,418,784 | McCormick et al. | Apr. 18, 1947 |

OTHER REFERENCES

Gurwitsch et al.: Scientific Principles of Petroleum Technology, New Edition, published by Chapman and Hall Ltd., 11, Henrietta St., London (1932), page 428.

Kalichevsky et al.: Chemical Refining of Petroleum, Chemical Catalog Co., 330 W. 42nd St., New York, N. Y., pp. 92, 93 and 95, (1933).

Sachanen: Chemical Constituents of Petroleum, Reinhold Publishing Corp., 330 W. 42nd Street, New York, N. Y., p. 321, (1945).

Elder et al.: Textbook of Chemistry, published by Harper Bros., New York, N. Y. (1948), p. 239.